United States Patent
Go

(10) Patent No.: US 6,833,999 B2
(45) Date of Patent: Dec. 21, 2004

(54) OPTICAL MODULE AND METHOD OF MAKING THE SAME

(75) Inventor: Hisao Go, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 402 days.

(21) Appl. No.: 10/076,520

(22) Filed: Feb. 19, 2002

(65) Prior Publication Data

US 2002/0114142 A1 Aug. 22, 2002

(30) Foreign Application Priority Data

Feb. 19, 2001 (JP) .................................... P2001-042139

(51) Int. Cl.⁷ ............................ H05K 5/02; H05K 7/18
(52) U.S. Cl. ....................... 361/813; 361/809; 385/92
(58) Field of Search .............................. 361/723, 728, 361/730, 736, 740, 741, 742, 747, 748, 752, 756, 758, 759, 760, 768, 772, 773, 774, 776, 801, 802, 803

(56) References Cited

U.S. PATENT DOCUMENTS

| | | | |
|---|---|---|---|
| 5,113,466 A | 5/1992 | Acarlar et al. | |
| 5,123,066 A | 6/1992 | Acarlar | |
| 5,170,453 A | 12/1992 | Go et al. | |
| 6,333,804 B1 * | 12/2001 | Nishiyama et al. | 398/202 |
| 6,435,734 B2 * | 8/2002 | Okada et al. | 385/88 |
| 6,457,877 B2 * | 10/2002 | Kato et al. | 385/92 |
| 6,500,026 B2 * | 12/2002 | Yamaguchi | 439/577 |
| 6,513,993 B1 * | 2/2003 | Nakanishi et al. | 385/92 |
| 6,565,267 B2 * | 5/2003 | Abe et al. | 385/88 |
| 6,576,888 B2 * | 6/2003 | Fujimura et al. | 250/227.11 |
| 6,632,027 B1 * | 10/2003 | Yoshida et al. | 385/88 |
| 6,652,160 B2 * | 11/2003 | Inujima et al. | 385/92 |

FOREIGN PATENT DOCUMENTS

| | | |
|---|---|---|
| JP | 2-126107 | 5/1990 |
| JP | 2-268471 | 11/1990 |
| JP | 2-271308 | 11/1990 |

* cited by examiner

*Primary Examiner*—Phuong T. Vu
(74) *Attorney, Agent, or Firm*—McDermott Will & Emery LLP

(57) ABSTRACT

An optical module comprises (1) an optical device assembly having an optical device for converting one of optical and electric signals into the other; (2) a circuit board for mounting an electronic device to electrically connect with the optical device; (3) a lead frame having a lead pin, a board mounting part for mounting the circuit board, and a support part which are provided on a reference surface; (4) a holding member having a holding part for grasping and holding the optical device assembly, and a grasping part for grasping the support part of the lead frame; and (5) a resin member for encapsulating the optical device assembly, the circuit board, the holding member, and the lead frame.

12 Claims, 19 Drawing Sheets

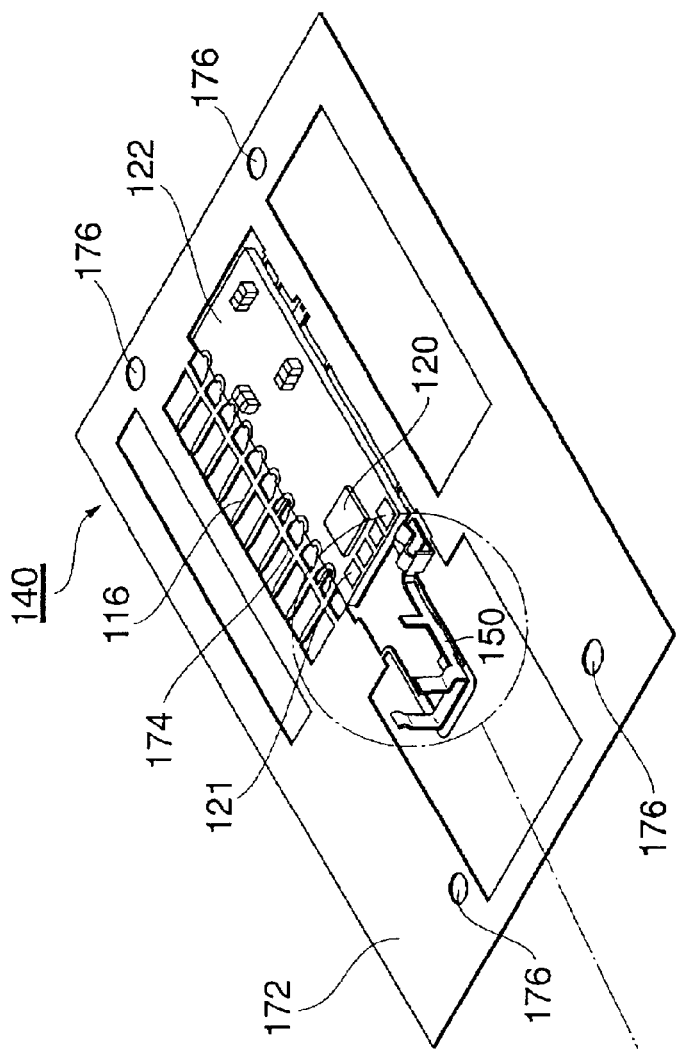
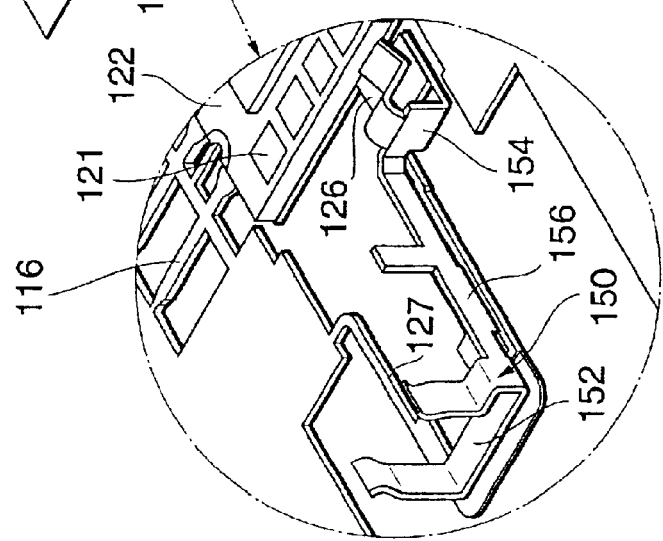
Fig.20A
Fig.20B

OPTICAL MODULE AND METHOD OF MAKING THE SAME

BACKGROUND OF THE INVENTION

1. Field of the Invention

The present invention relates to an optical module used in an optical link apparatus for data communications and the like, and a method of making the same.

2. Related Background Art

An optical module for converting an electric signal into an optical signal and sending out the latter to an optical fiber or converting an optical signal from the optical fiber into an electric signal comprises an optical device and an electronic device electrically connected to the optical device, and is widely used for optical communication systems such as data links and optical LANs employing light as an information transmitting medium.

As disclosed in Japanese Patent Application Laid-Open No. HEI 2-271308, for example, a conventional optical module is formed such that a circuit board mounted with an electronic device and an optical device assembly including an optical device are placed at predetermined positions on a lead frame, and are integrally molded with an electrically insulating resin after being electrically connected to each other by wire bonding. In such an optical module, in order to prevent the bonded wire from breaking when transporting the lead frame to a mold for resin molding in the process of manufacturing, the optical device module is held by a holding member integrally provided with the lead frame so as to keep it from shifting the position. At that time, the optical axis of the optical device in the optical device assembly is located on the lead frame surface.

SUMMARY OF THE INVENTION

The inventors studied the conventional technique mentioned above and, as a result, have found the following problems. In optical modules, positions of lead pins, positions of optical axes of optical devices, and the like are defined by industrial standards. In recent years, demands from such industrial standards have made it necessary to shift the optical axes of optical devices in optical device assemblies from the lead frame surface.

However, it is not easy for a holding member integrally provided with the lead frame as in the above-mentioned conventional optical module to reliably hold an optical device assembly at a predetermined position while in a state where the optical axis of the optical device is shifted from the lead frame surface, and quickly respond to changes in design.

Hence, it has been proposed to provide a holding member separately from the lead frame, so as to hold the optical device assembly. As a consequence, when a change occurs in the design of optical module, the holding member can be changed as needed so as to quickly respond thereto. When a holding member is provided separately from the lead frame, however, potentials of the optical device assembly, holding member, and lead frame may become unstable if conduction is insufficient between the lead frame and the holding member or between the holding member and the optical device assembly, thus deteriorating characteristics of the optical module. Therefore, conduction must fully be secured between the above-mentioned members for high-speed transmissions in particular.

In order to eliminate the problems mentioned above, it is an object of the present invention to provide an optical module which can fully secure conduction between members so as to improve their characteristics while being able to quickly respond to changes in design, and a method of making the same.

The optical module in accordance with the present invention comprises (1) an optical device assembly having an optical device for converting one of optical and electric signals into the other; (2) a circuit board for mounting an electronic device to electrically connect with the optical device; (3) a lead frame having a lead pin, a board mounting part for mounting the circuit board, and a support part which are provided on a reference surface; (4) a holding member having a holding part for grasping and holding the optical device assembly, and a grasping part for grasping the support part of the lead frame; and (5) a resin member for encapsulating the optical device assembly, the circuit board, the holding member, and the lead frame.

Since this optical module has a holding member provided separately from the lead frame, it can easily respond to changes in design of the optical module by changing the holding member as needed. The holding member has a grasping part for grasping the support part of the lead frame, and a holding part for grasping and holding the optical device assembly. Therefore, conduction is fully secured between the optical device assembly and the holding member, and between the holding member and the support part, whereby characteristics of the optical module can be improved.

Preferably, in the optical module, the grasping part of the holding member has a base portion provided so as to extend along the reference surface, and a pressing portion for urging the support part of the lead frame toward the base portion. As a consequence, the support part of the lead frame is urged toward the base portion by the pressing portion, so as to be held between the base portion and the pressing portion. This fully secures conduction between the holding member and the support part.

Preferably, in the optical module, the grasping part has a narrowest portion yielding a narrowest width between the base portion and the pressing portion, whereas the width between the base portion and pressing portion in an end portion of the grasping part on a side introduced to the support part is greater than that between the base portion and pressing portion in the narrowest portion. Preferably, an edge portion of the support part on a side where the grasping portion is introduced has a thickness smaller than that in the other portion. This makes it easier to introduce the holding member to the support part.

Preferably, in the optical module, the lead frame further comprises an auxiliary part for aiding in supporting the holding member provided on the reference surface. As a consequence, the holding member is supported more stably by the auxiliary part.

Preferably, in the optical module, the auxiliary part of the lead frame includes a positioning hole for positioning the holding member, whereas the holding member has a protrusion adapted to fit into the positioning hole. This makes it easier to position the holding member and improves the accuracy in positioning.

Preferably, in the optical module, the holding part of the holding member includes a pair of sheet spring members for holding the optical device assembly therebetween. As a consequence, the optical device assembly is held between a pair of sheet spring members, whereby conduction is fully secured therebetween.

In the optical module, the optical axis of the optical device in the optical device assembly is shifted from the reference surface. In optical modules, positions of lead pins, positions of optical axes of optical devices, and the like are defined by industrial standards, which make it necessary to shift the optical axes of optical devices in optical device assemblies from the lead frame surface. This optical module can satisfy such demands from industrial standards.

In the optical module, the optical device assembly and the circuit board are electrically connected to each other by bonding wires. In the optical module, the optical device assembly is held by the holding member while the optical device assembly and the circuit board are connected to each other by bonding wires, whereby the fear of wires breaking is reduced.

The optical module can be made by a method of making an optical module having the following steps. This method comprises (1) a step of mounting the circuit board onto the board mounting part of the lead frame; (2) a step of grasping the support part of the lead frame with the grasping part of the holding member and supporting the holding member displaceable along the reference surface; (3) a step of grasping and holding the optical device assembly with the holding part of the holding member; (4) a step of providing wire bonding between the optical device assembly and the circuit board; and (5) a step of encapsulating the optical device assembly, the circuit board, the lead frame, and the holding member with a resin.

The method of making an optical module may further comprise a step of positioning the holding member prior to the resin encapsulating step. As a consequence, the holding member can be positioned while being dislocated along the reference surface before being encapsulated with a resin, so that the positioning accuracy can be enhanced, whereby the yield and characteristics of thus produced optical module can be improved.

In the above-mentioned method of making an optical module, the grasping part of the holding member may have a base portion and a pressing portion for urging the support part of the lead frame toward the base portion, whereas the step of supporting the holding member may include a step of engaging an edge portion of the support part between the base portion and the pressing portion, and a step of pushing the holding member toward the support part. As a consequence, a position for supporting the holding member can approximately be determined by engaging the edge portion of the support part between the base portion and the pressing portion, and the holding member is supported by the support part when the holding member is pushed toward the support part.

The present invention will become more fully understood from the detailed description given hereinbelow and the accompanying drawings. They are given by way of illustration only, and thus should not be considered limitative of the present invention.

BRIEF DESCRIPTION OF THE DRAWINGS

FIGS. 18 and 19, 20A and 20B, 21, 22A and 22B, and 23 and 24 are views showing steps of making the receiving optical module;

DETAILED DESCRIPTION OF THE PREFERRED EMBODIMENTS

In the following, a preferred embodiment of the optical module in accordance with the present invention will be explained with reference to the accompanying drawings. In the explanation of the drawings, constituents identical to each other will be referred to with numerals identical to each other without repeating their overlapping explanations.

Figure 1:
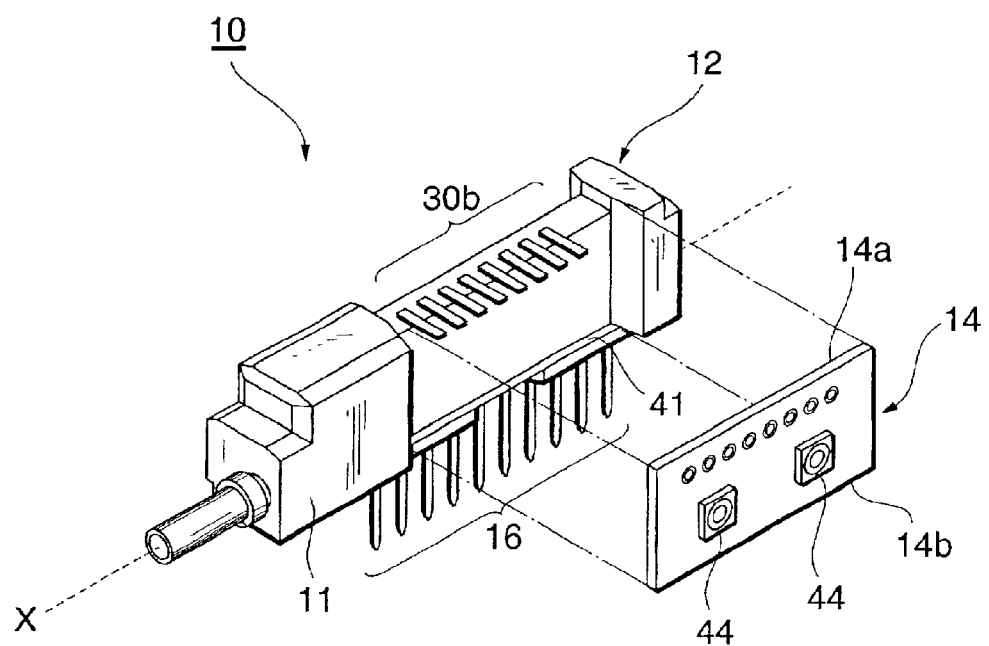
FIG. 1 is a perspective view showing a transmitting optical module in an exploded state.

FIG. 1 is a perspective view showing a transmitting optical module 10 in an exploded state. As shown in FIG. 1, the optical module 10 comprises an optical module body 12 and an external board 14 mounted with volumes 44 as variable resistors for adjusting electric characteristics of the optical module body 12. The external board 14 is secured to a side face of the optical module body 12.

As shown in FIG. 1, the optical module body 12 has a structure of SIP (single inline package) type whose exterior is substantially formed like a square pole with a first lead array 16 projecting from the bottom face. First, for convenience of explanation, the inner configuration of the optical module body 12 will be explained.

Figure 2:
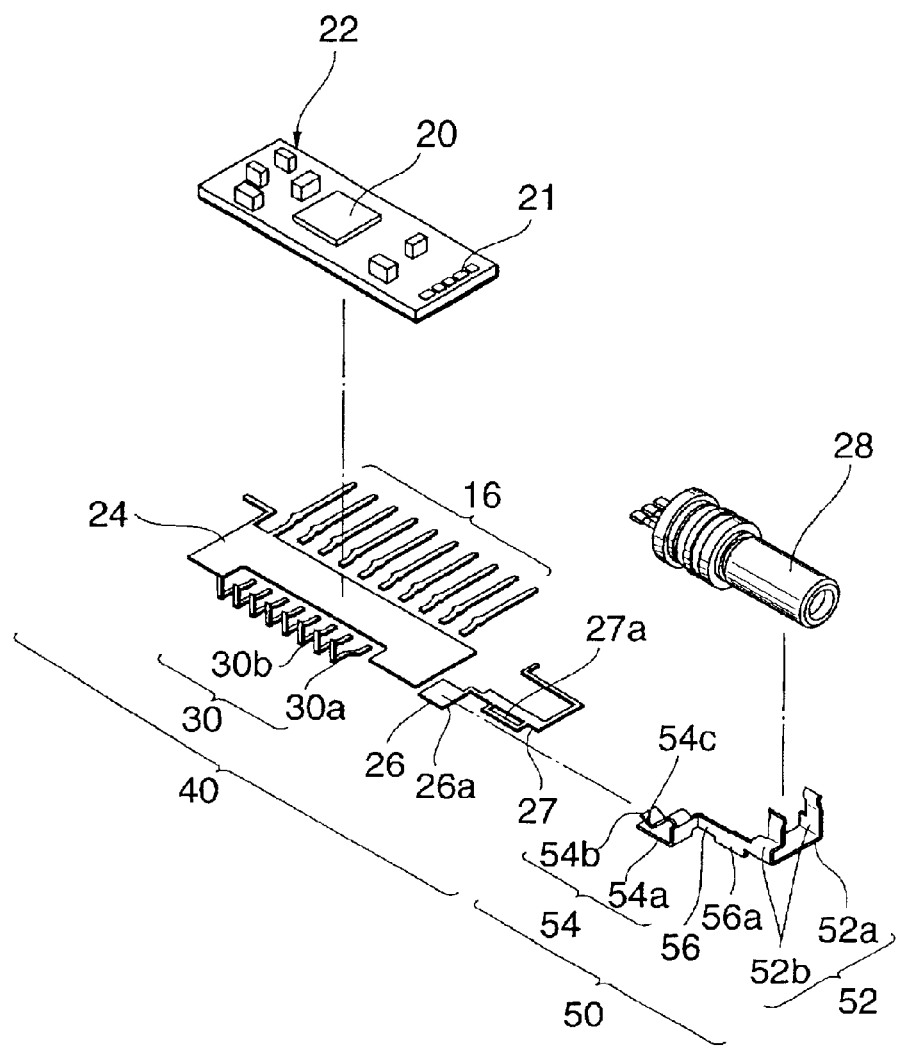
FIG. 2 is a perspective view showing the inner structure of the transmitting optical module in an exploded state.

FIG. 2 is a perspective view showing the inner configuration of the optical module body 12 in an exploded state. As shown in FIG. 2, within a resin member (11 in FIG. 1), the optical module body 12 comprises a light-emitting device assembly (optical device assembly) 28, an electronic device 20, an internal board (circuit board) 22, a lead frame 40, and a holding member 50. The light-emitting device assembly 28 includes a light-emitting device (optical device) 18 for converting an electric signal into an optical signal. The electronic device 20 drives the light-emitting device 18. The internal board 22 mounts the electronic device 20 thereon. The lead frame 40 has an island (board mounting part) 24, the first lead array 16, a second lead array 30, and a support part 26. The holding member 50 holds the light-emitting device assembly 28.

The island 24, first lead array 16, second lead array 30, and support part 26 constituting the lead frame 40 are provided on a reference plane including the island 24. The first lead array 16 is constituted by 10 lead pins, and is connected to a mount board (not depicted), so as to make it possible to transmit electric signals between the optical module body 12 and the outside. On the other hand, the second lead array 30 is constituted by 8 lead pins, and is connected to the external board 14, so as to make it possible to transmit electric signals between the optical module body 12 and the external board 14. The first lead array 16 extends along the reference surface including the island 24. The second lead array 30 has a base portion 30a extending along the reference surface and a bent portion 30b bent at a predetermined angle with respect to the base portion 30a.

Figure 3:
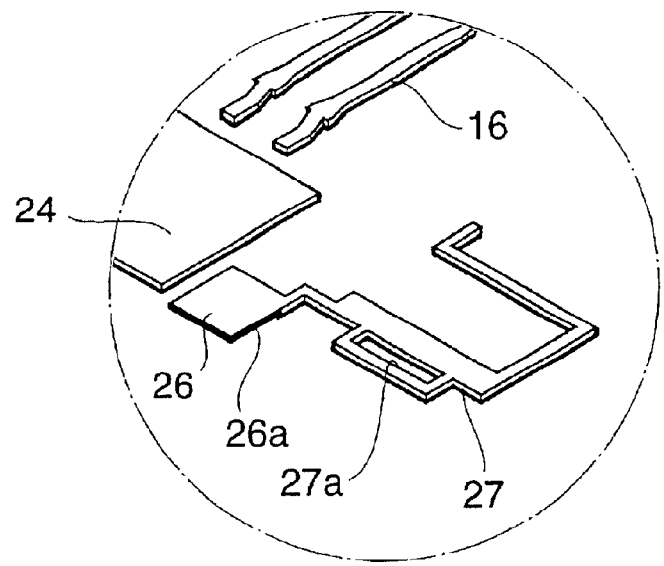
FIG. 3 is a view showing, under magnification, the vicinity of the support part shown in FIG. 2.

FIG. 3 is a view showing, under magnification, the vicinity of the support part 26 included in the lead frame 40 shown in FIG. 2. As shown in FIG. 3, the support part 26 is provided on the reference surface including the island 24, whereas its edge portion 26a on the side where the holding member 50 is introduced has a thickness smaller than that of the other portion.

Also, as shown in FIGS. 2 and 3, the lead frame 40 has an auxiliary part 27 for aiding in supporting the holding member 50. The auxiliary part 27 is constituted by a frame-like member having one end connected to the support part 26. The auxiliary part 27 includes a positioning hole 27a for positioning the holding member 50. The positioning hole 27a is set to such a size that a clearance of several hundreds of micrometers is yielded when a positioning protrusion 56a of the holding member 50 which will be explained later is fitted therein. The auxiliary part 27 is provided on the reference surface including the island 24 as with the other members constituting the lead frame 40.

Preferably, the lead frame 40 is formed from a metal excellent in heat radiation such as Cu type alloys. Preferably, for enhancing the resistance to corrosion and the soldering property, the lead frame 40 is plated with Ni, Ni/Au, Ni/Pd, Ni/Pd/Au, and the like. In this embodiment, the potential of the island 24 is $V_{cc}$.

Figure 4:
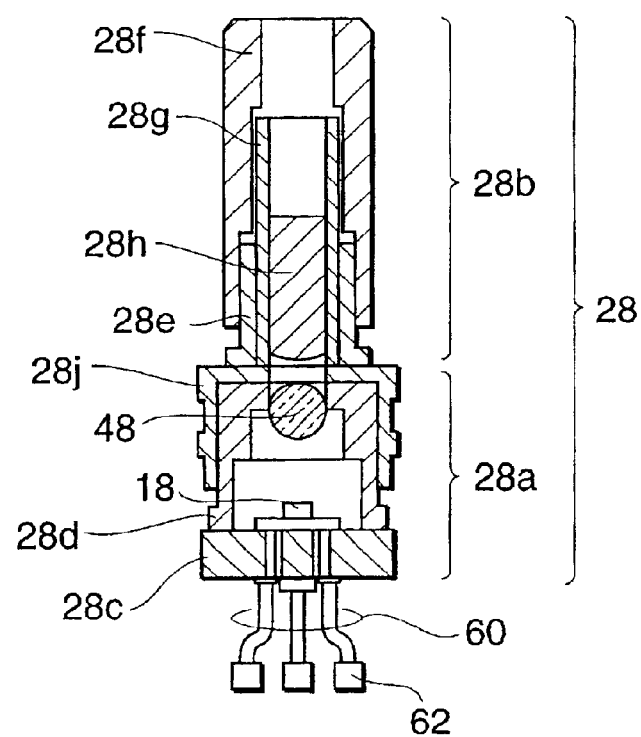
FIG. 4 is a sectional view showing the structure of a light-emitting device assembly.

As shown in FIG. 4, the light-emitting device assembly 28 has a device container 28a and a guide portion 28b. The device container 28a hermetically encloses therein the light-emitting device 18 such as a light-emitting diode or a semiconductor laser, for example. The device container 28a has abase 28c formed from a metal material such as covar. Mounted on the base 28c is a lens cap 28d made of a metal material such as stainless steel. The device container 28a has a window 48 formed in the lens cap 28d. The window 48 can include a condenser lens, and can transmit therethrough light emitted from the light-emitting device 18. The lens cap 28d is inserted into a holder 28j made of a metal material such as stainless steel. The base 28c also has connection pins 60 for electrically connecting with the light-emitting device 18. The connection pins 60 are subjected to lead forming so as to form flat portions 62, thus yielding a form suitable for wire bonding.

The guide portion 28b has a guide member 28e made of a metal material such as stainless steel. The guide member 28e is secured on the holder 28j. A sleeve 28f made of a metal material such as stainless steel is arranged outside the guide member 28e. Accommodated within the guide member 28e is a split sleeve 28g formed from a material such as zirconia. The split sleeve 28g positions a stab 28h in which an optical fiber is accommodated.

The electronic device 20 is a signal processing device for carrying out a predetermined processing operation to a signal received thereby and outputting the processed signal, e.g., a device incorporating therein a driving circuit for driving the light-emitting device 18 included in the light-emitting device assembly 28. As shown in FIG. 2, the electronic device 20 is mounted on the internal board 22 made of a ceramic multilayer wiring board or the like, whereas the internal board 22 is mounted on the island 24 of the lead frame 40.

The holding member 50 has a holding part 52 for holding the light-emitting device assembly 28, and a grasping part 54 for grasping the support part 26 of the lead frame 40. The holding part 52 includes a base portion 52a adapted to abut against the side face of the sleeve 28f of the light-emitting device assembly 28, and a pair of sheet spring pieces 52b formed in a bending fashion at both ends of the base portion 52a so as to hold the sleeve 28f therebetween. The grasping part 54 for grasping the support part 26 of the lead frame 40 has abase portion 54a and a pressing portion 54b for urging the support part 26 toward the base portion 54a. The pressing portion 54b is formed so as to bend like letter V, such that a bent portion 54c is located on the base portion 54a side, whereby the width between the base portion 54a and the pressing portion 54b is the narrowest in the bent portion 54c. Also, the width between the base portion 54a and pressing portion 54b in the end part on the side to be introduced to the support part 26 is greater than that in the bent portion 54c. This allows the grasping part 54 to be easily introduced to the support part 26. The holding part 52 and the grasping part 54 are connected to each other by a connecting part 56. The connecting part 56 is provided with a protrusion 56a adapted to fit into the positioning hole 27a in the auxiliary part 27 of the lead frame 40.

The ultimate strength of the holding member 50 is preferably as high as possible. When holding the optical device assembly 28 with the holding member 50 or attaching the holding member 50 to the support part 26, a distortion occurs in the holding member 50. If the stress accompanying this distortion exceeds the ultimate strength, the holding member 50 may break at the time when a slight stress applies thereto after the attachment. Even if the holding member 50 does not break, its force for grasping the optical device assembly 28 or support part 26 may decrease due to plastic deformation, thereby lowering the degree of conduction. Therefore, it is necessary that the holding member 50 be designed such that the force acting on at least the grasping part 54 and holding part 52 of the holding member 50 becomes a stress not greater than the ultimate strength, preferably not higher than the yield point (so that the distortion of the holding member 50 is an elastic strain). From this point, the ultimate strength is preferably as high as possible when choosing a material for the holding member 50.

Since the holding member 50 is formed as a component separate from the lead frame 40 in this embodiment, a material can be chosen for the holding member 50 while taking a preference for its ultimate strength, whereas a material can be chosen for the lead frame 40 while taking a preference for its heat radiation, whereby the degree of freedom in choosing the material for the holding member 50 increases. As the material for the holding member 50, phosphor bronze, nickel silver, stainless steel, and the like are suitable.

In the optical module 10 in accordance with this embodiment, the grasping part 54 of the holding member 50 grasps the support part 26 of the lead frame 40, whereby the holding member 50 is supported. Here, the positioning protrusion 56a of the connecting part 56 of the holding member 50 is inserted in the positioning hole 27a of the auxiliary part 27 of the lead frame 40 so as to be positioned, whereas the holding member 50 is supported by the auxiliary part 27 by way of the holding part 52. While in a state held on the holding member 50 by way of the holding part 52, the light-emitting device assembly 28 is subjected to wire bonding between connection pins 60 extending from the base 28c of the light-emitting device assembly 28 and bonding pads 21 on the internal board 22, whereby electric connection is achieved between the light-emitting device 18 and the electronic device 20.

The optical module body 12 is constructed such that the light-emitting device assembly 28; the internal board 22 mounted with the electronic device 20; the lead frame 40 including the island 24, first lead array 16, second lead array 30, and support part 26; and the holding member 50 are encapsulated with the resin member 11.

Here, as shown in FIG. 1, the first lead array 16 is resin-encapsulated at only one end, whereas the other end projects from the resin member 11. The second lead array 30 is resin-encapsulated at only the base portion 30a, whereas the bent portion 30b bent at a predetermined angle with respect to the base portion 30a projects from the resin member 11. The sleeve 28f of the light-emitting device assembly 28 is resin-encapsulated at only one end, whereas the other end projects from the resin member 11.

As a consequence, the optical module body 12 is formed into a substantially square pole having two side faces, positioned parallel to the resin-encapsulated internal substrate 22, extending along the optical axis X; and two side faces, positioned perpendicular to the internal board 22, from which the first lead array 16 and the second lead array 30 project, respectively.

The optical axis X of the light-emitting device 18 in the light-emitting device assembly 28 is shifted from the reference surface including the island 24 of the lead frame 40. In the optical module 10, positions of the lead arrays 16, 30, the position of the optical axis X of the light-emitting device 18, and the like are defined by industrial standards, which make it necessary to shift the optical axis X of the light-emitting device 18 in the light-emitting device assembly 28 from the reference surface. Since the holding member 50 is constructed as a member separate from the lead frame 40, the optical module 10 can easily satisfy such a demand of industrial standards.

One of two side faces positioned parallel to the internal board 22 is formed with a support protrusion 41 for supporting the lower side 14b of the external board 14 as shown in FIG. 1. The bent portion 30b of the second lead array 30 is bent toward the support protrusion 41, so as to be soldered to bonding pads provided on the rear face of the external board 14. Therefore, when the lower side 14b of the external board 14 is mounted on the support protrusion 41, and the bent portion 30b of the second lead array 30 is soldered to the bonding pads on the rear face of the external board 14, the external board 14 can be secured.

As shown in FIG. 1, the external board 14 has an area on a par with that of the internal board 22 and is constituted by a board provided with printed wiring, and two volumes 44 mounted thereon. One of the two volumes 44 is used for adjusting the optical output from the light-emitting device 18 of the resin-encapsulated light-emitting device assembly 28, whereas the other is used for adjusting the bias current supplied to the light-emitting device 18 of the light-emitting device assembly 28. The rear face of the external board 14 is formed with eight bonding pads aligning with respective positions of eight lead pins of the second lead array 30, so as to function as terminals for electrically connecting the optical module body 12 and the external board 14 to each other.

The lower side 14b of the external board 14 is supported by the support protrusion 41 on a side face of the optical module 12, the bonding pads on the rear face are soldered to the bent portion 30b of the second lead array 30, and so forth, whereby the external board 14 is secured to the optical module body 12.

A method of making the transmitting optical module 10 in accordance with this embodiment will now be explained.

Figure 5:
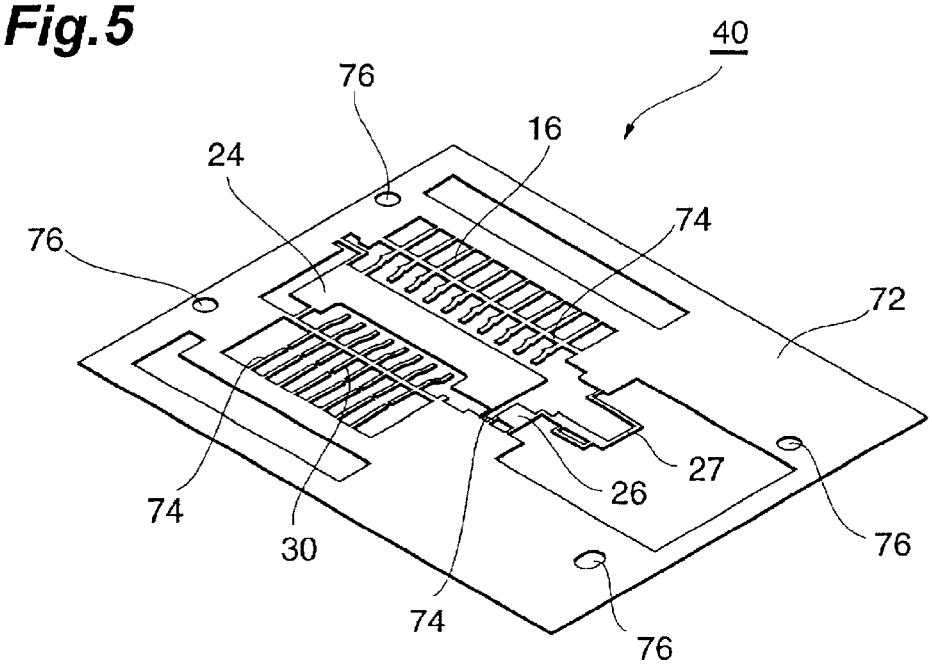
FIGS. 5 and 6, 7A and 7B, 8 to 10, 11A and 11B, and 12 and 13 are views showing steps of making the transmitting optical module.

First, as shown in FIG. 5, a lead frame 40 having an island 24 for mounting an internal substrate 22, a first lead array 16, an unbent second lead array 30, a support part 26 for supporting a holding member 50, and an auxiliary part 27 is prepared. These members constituting the lead frame 40 are integrated by an outer frame part 72 and suspension pins 74. Here, the support part 26 is connected to the outer frame part 72 by way of suspension pins 74 alone, while being separated from the island 24. Such a lead frame 40 can be integrally formed by etching a thin metal sheet or punching it with a press, for example. A plurality of holes 76 for positioning a mold for resin molding, which will be explained later, are formed at predetermined positions of the outer frame part 72.

On the other hand, a light-emitting device assembly 28 accommodating therein a light-emitting device 18 such as the one shown in FIG. 4, an electronic device 20 and an internal board 22 for mounting the electronic device 20 such as those shown in FIG. 2, a holding member 50 such as the one shown in FIG. 2, and an external substrate 14, provided with printed wiring, having a main face mounted with volumes 44 thereon are prepared.

Figure 6:
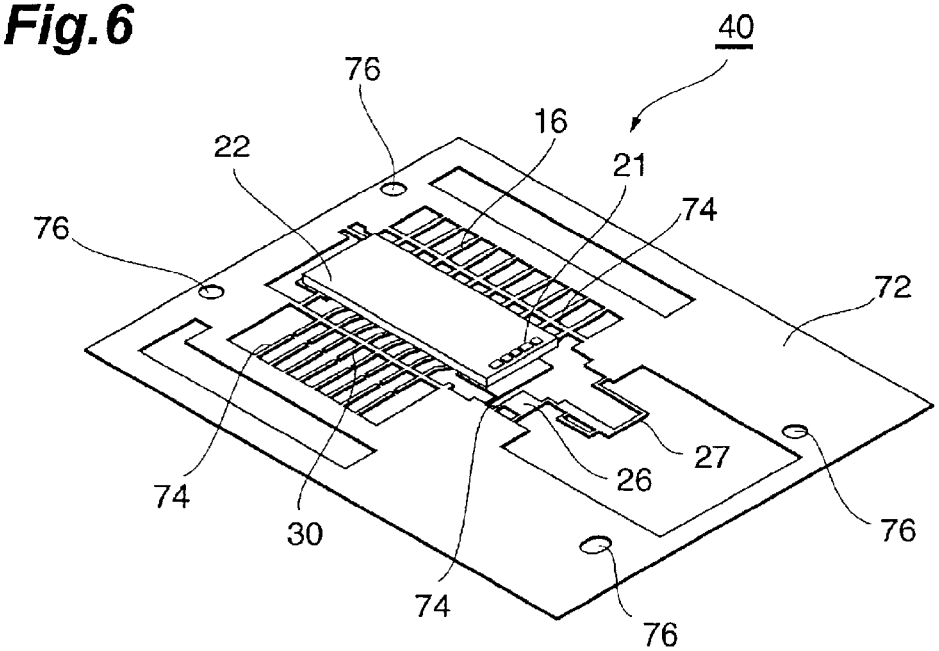

Subsequently, as shown in FIG. 6, the internal board 22 for mounting the electronic device 20 is mounted on the island 24 of the lead frame 40. Here, the internal board 22 is positioned such that end parts of the first and second lead pins 16, 30 are located at their corresponding plurality of pads provided on the rear face of the internal board 22, and the internal board 22 and the first and second lead pins 16, 30 are electrically connected to each other by soldering and the like.

Figure 7A:
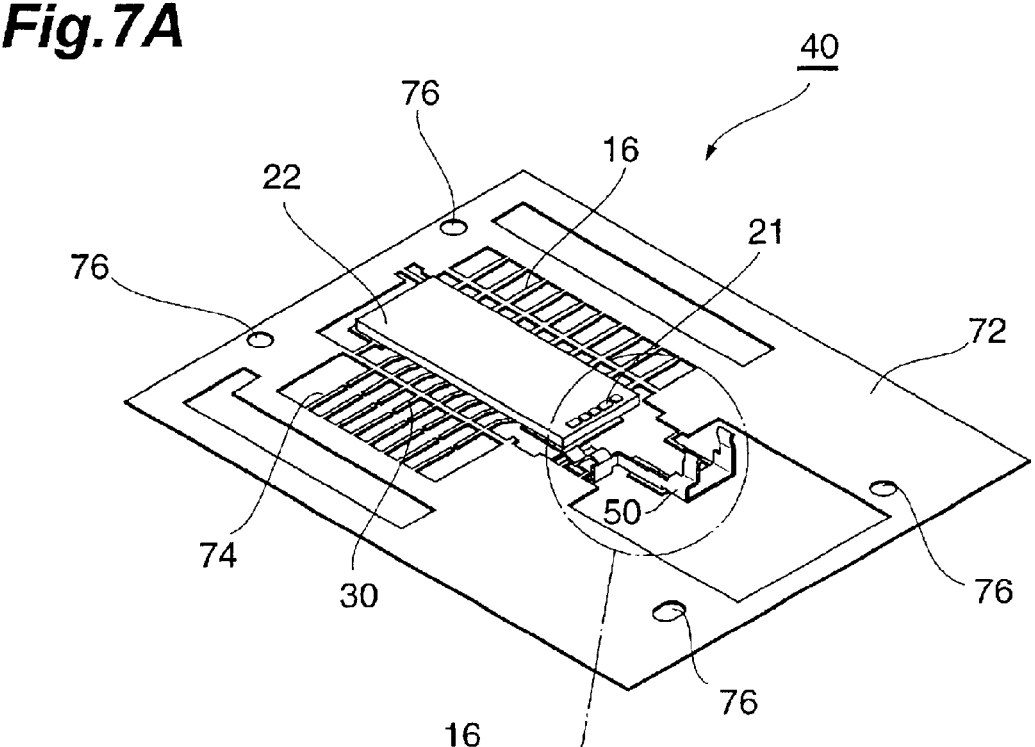
Figure 7B:
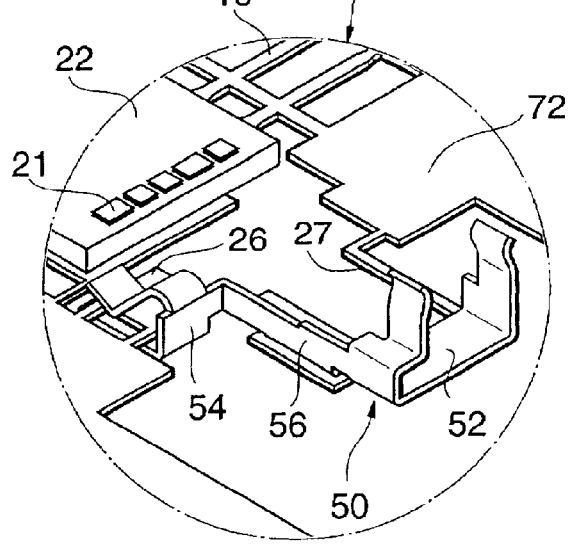

Next, as shown in FIGS. 7A and 7B, the holding member 50 is supported by the support part 26 of the lead frame 40. Here, FIG. 7A is a view showing the state where the holding member 50 is supported by the support part 26 of the lead frame 40, whereas FIG. 7B is a view enlarging the vicinity of the holding member 50 shown in FIG. 7A.

Figure 8:
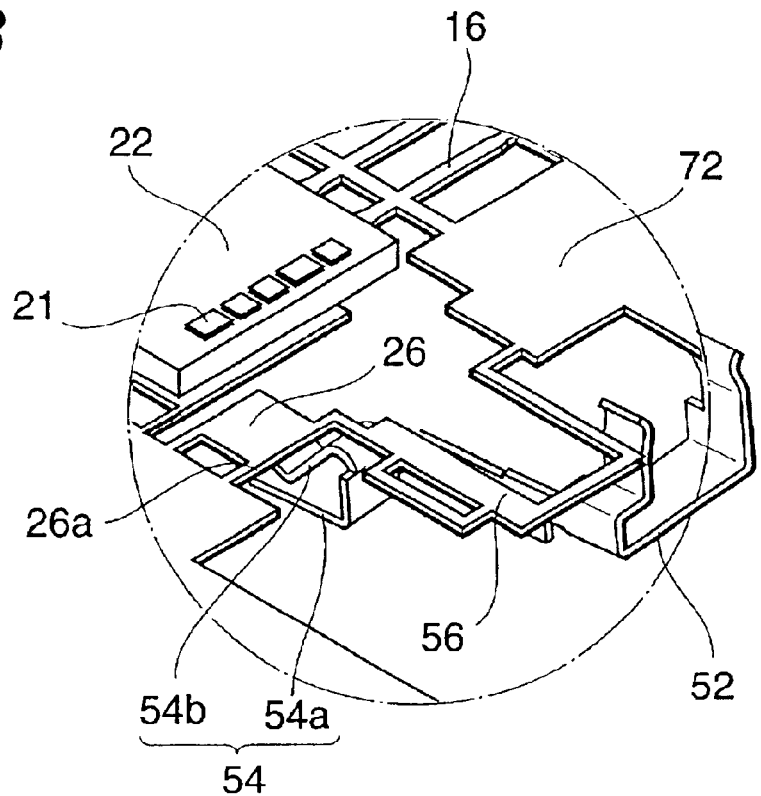
Figure 9:
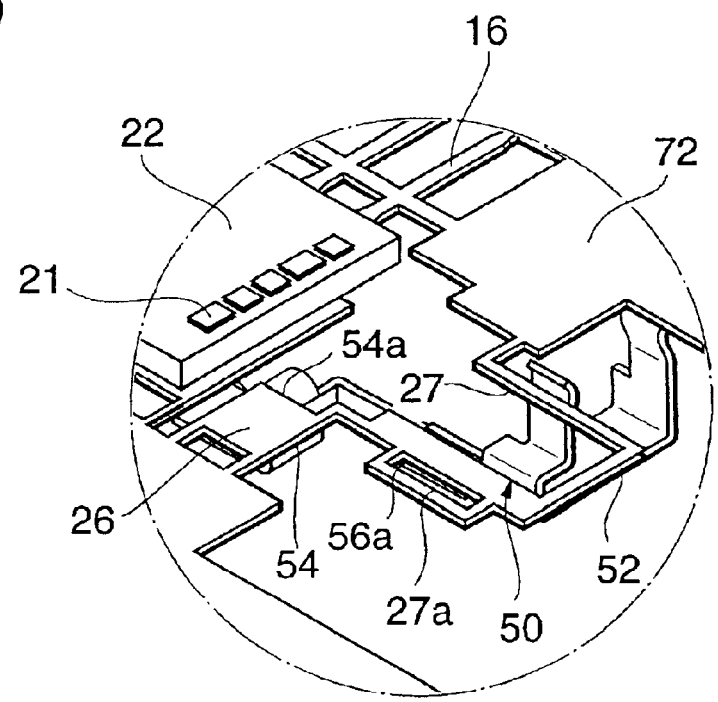

In the step of supporting the holding member, as shown in FIG. 8, the edge portion 26a of the support part 26 of the lead frame 40 is engaged between the base portion 54a and pressing portion 54b of the grasping part 54 of the holding member 50. Subsequently, as shown in FIG. 9, the holding member 50 is pushed toward the support part 26 against the urging force of the pressing portion 54b. Here, the edge portion 26a on the side to which the grasping part 54 of the support member 26 is introduced has a thickness smaller than that of the other portion, whereby the holding member 50 can be introduced to the support part 26 easily. Then, the positioning protrusion 56a of the holding member 50 is fitted into the positioning hole 27a of the auxiliary part 27 of the lead frame 40, so as to carry out rough positioning. Here, since a clearance of about several hundreds of micrometers exists between the positioning protrusion 56a and the positioning hole 27a, the holding member 50 can be displaced along the reference surface including the island 24 even in thus positioned state.

Figure 10:
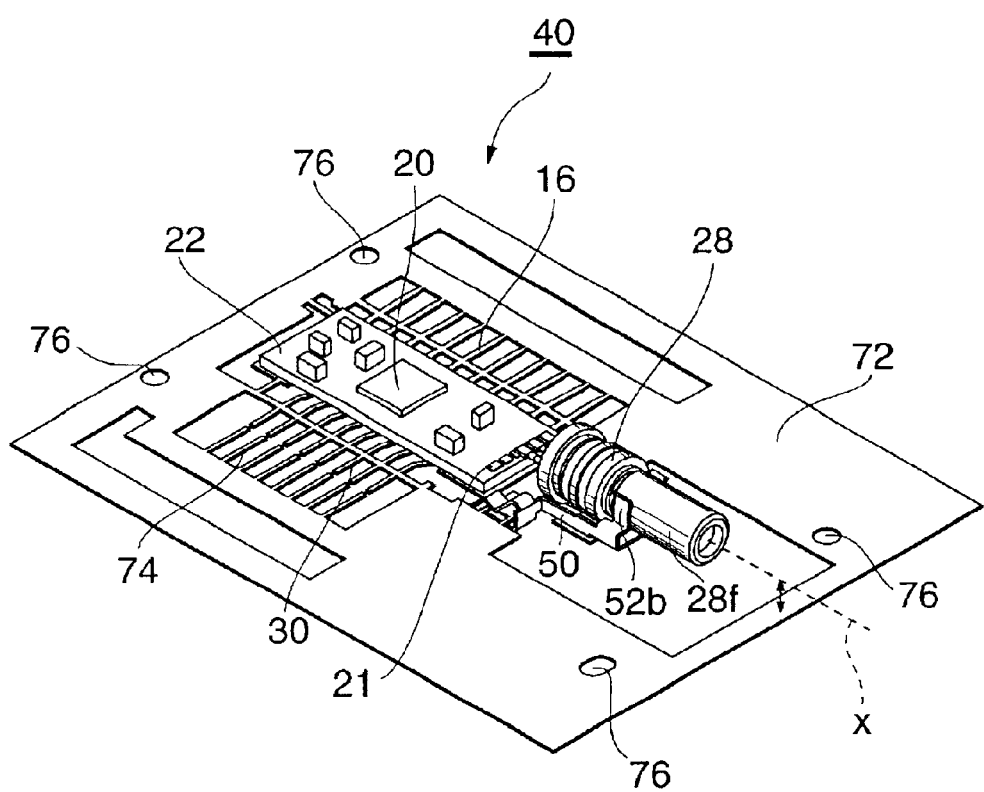

Subsequently, as shown in FIG. 10, the light-emitting device assembly 28 is mounted on the holding member 50 and held thereby such that the sleeve 28f is sandwiched between a pair of sheet spring pieces 52b constituting the holding part 52. Here, even after the light-emitting device module 28 is mounted on the holding member 50, the light-emitting device module 28 has a flexibility with respect to the lead frame 40 due to the sliding in the grasping part 54 of the holding member 50 and the elasticity of the holding member 50 itself. Therefore, a high degree of positioning is unnecessary at this stage, which facilitates assembling.

Next, the electronic component 20 is mounted on the internal board 22. Alternatively, the electronic component 20 can be mounted on the internal board 22 beforehand.

Subsequently, wire bonding is effected between connection pins 60 and bonding pads 21 of the internal board 22 by use of Al wires and the like.

Figure 11A:
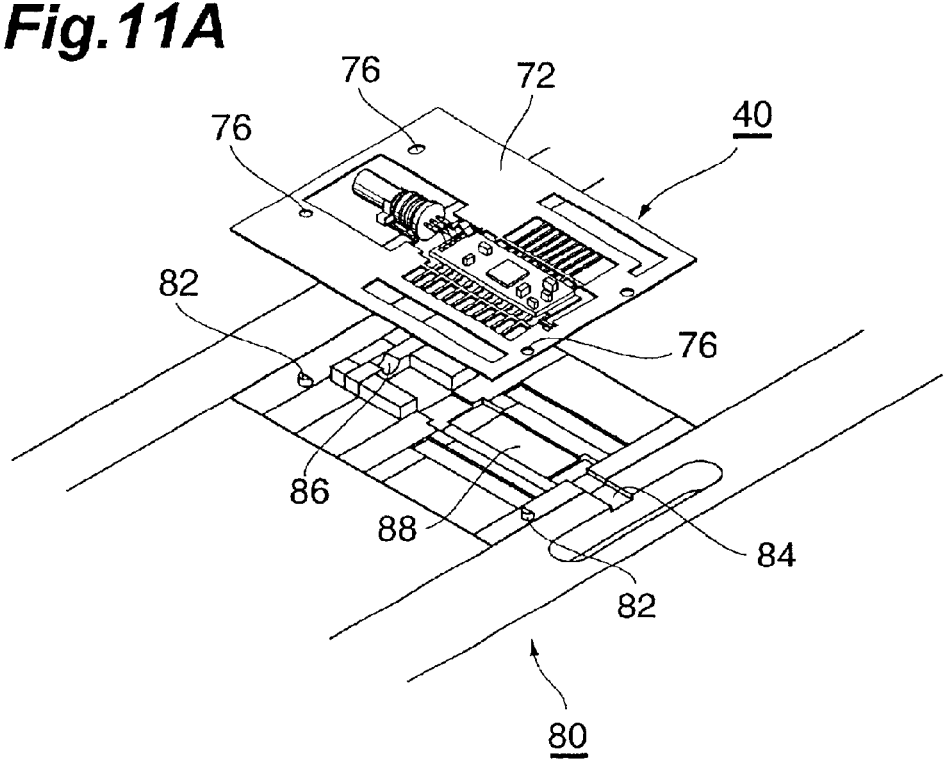
Figure 11B:
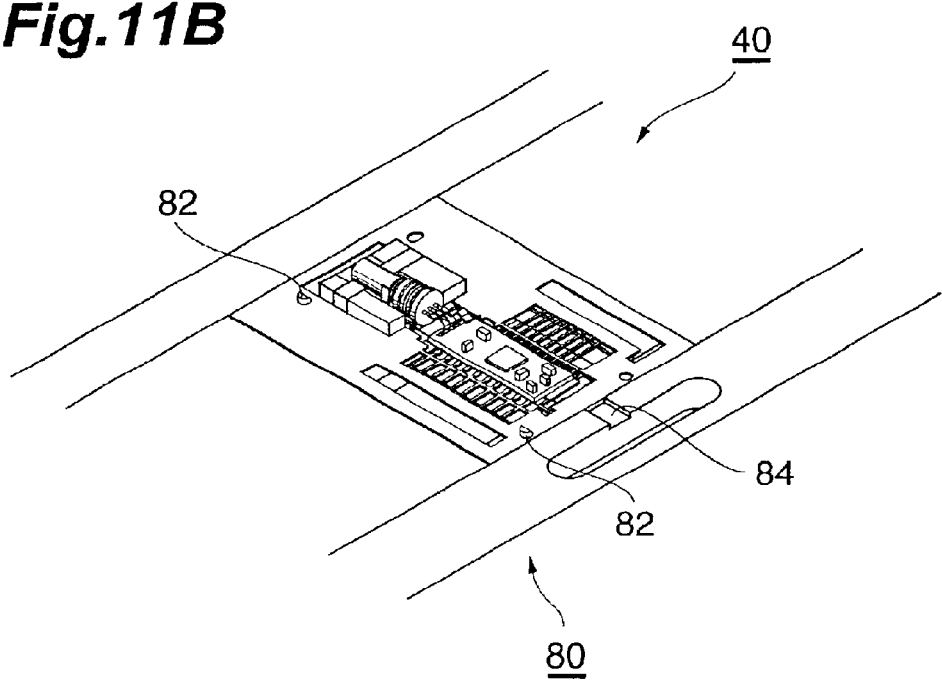

Then, as shown in FIGS. 11A and 11B, pilot pins 82 of a mold 80 for resin molding are inserted into holes 76 formed in the outer frame part 72, whereby the lead frame 40 is positioned and attached to the mold 80. Here, since the light-emitting device assembly 28 is reliably held by the holding member 50, it hardly causes positional deviations during when the lead frame 40 is transferred to the mold 80, whereby the fear of bonded wires breaking is lowered. The relative positional accuracy between the mold 80 and the lead frame 40 is determined by the dimensional accuracy of the lead frame 40, and is about ±30 μm in general. On the other hand, the position of the light-emitting device assembly 28 with respect to the mold 80 is determined by a sleeve aligning part 86 which is a groove having a semicircular cross section. Since a thermosetting resin is injected into a cavity 88 at a high pressure in a transfer-molding step, the outer diameter of the sleeve 28f and the sleeve aligning part 86 are under control so as to have a gap of about 10 μm therebetween.

Subsequently, the light-emitting device module 28 is precisely positioned within the mold 80 before resin encapsulation. Here, since the holding member 50 can be displaced along the reference surface, the positioning accuracy becomes higher when the light-emitting device assembly 28 is positioned before resin encapsulation as such, whereby the yield and characteristics of thus produced optical module 10 can be improved.

Figure 12:
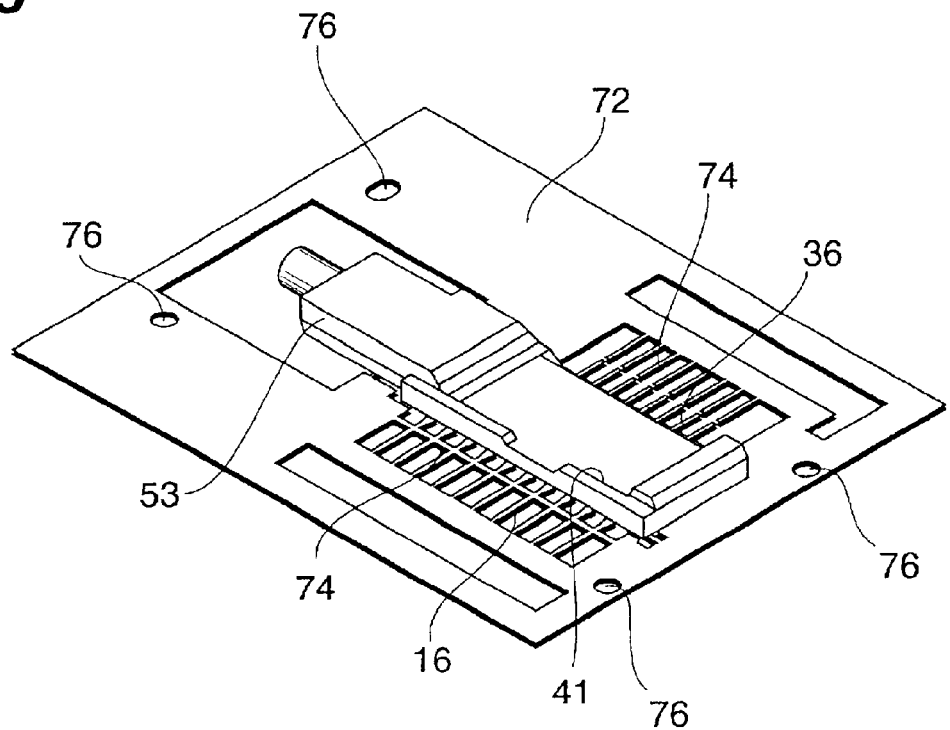

Next, while a resin is injected into the mold 80 through a gate 84, the light-emitting device assembly 28, the internal board 22 mounted with the electronic device 20, the lead frame 40 including the island 24, first lead array 16, second lead array 30, support part 26, and auxiliary part 27, and the holding member 50 are encapsulated with the resin. Here, as shown in FIG. 12, a support protrusion 41 for supporting the lower side 14b of the external board 14 is integrally molded at a side face of the optical module body 12 by the mold 80.

Figure 13:
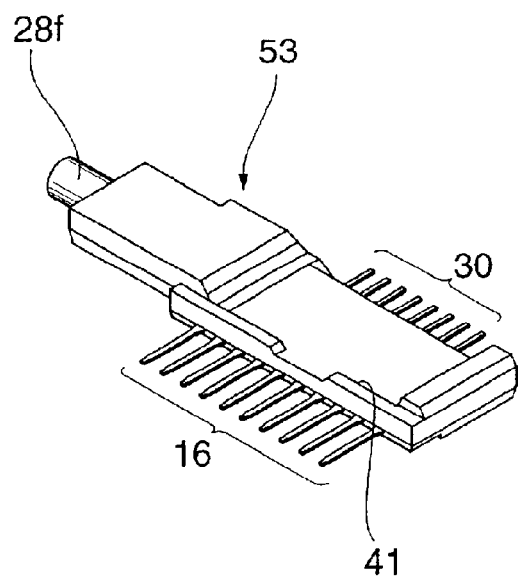

After the resin encapsulation, a resin-encapsulated component 53 integrated with the outer frame part 72 is removed from the mold 80, and the outer frame part 72 and suspension pins 74, which are unnecessary, are cut and eliminated. This produces the resin-encapsulated component 53 shown in FIG. 13, which is an intermediate component before the second lead array 30 is bent. In this resin-encapsulated component 53, the support part 26 of the lead frame 40 is electrically connected to the island 24 by way of the holding member 50, light-emitting device assembly 28, bonding wires, and inner board 22.

Subsequently, the second lead array 30 of the resin-encapsulated component 53 is bent with a predetermined angle toward the support protrusion 41, so as to yield an optical module body 12. Then, while the lower side 14b of the external board 14 is mounted on the support protrusion 41, the bent portion 30b of the second lead array 30 is caused to abut against the bonding pads on the rear face of the external board 14 and connected thereto by soldering or the like. Thus, the making of the optical module 10 is completed. In this optical module 10, the potential of the light-emitting device assembly 28 is $V_{cc}$ which is the same as that of the island 24. This stabilizes the potential of the light-emitting device assembly 28, thereby being effective in improving the optical output waveform.

Though the transmitting optical module 10 is explained in the foregoing, the present invention can construct a receiving optical module 110 in substantially the same manner.

Figure 14:
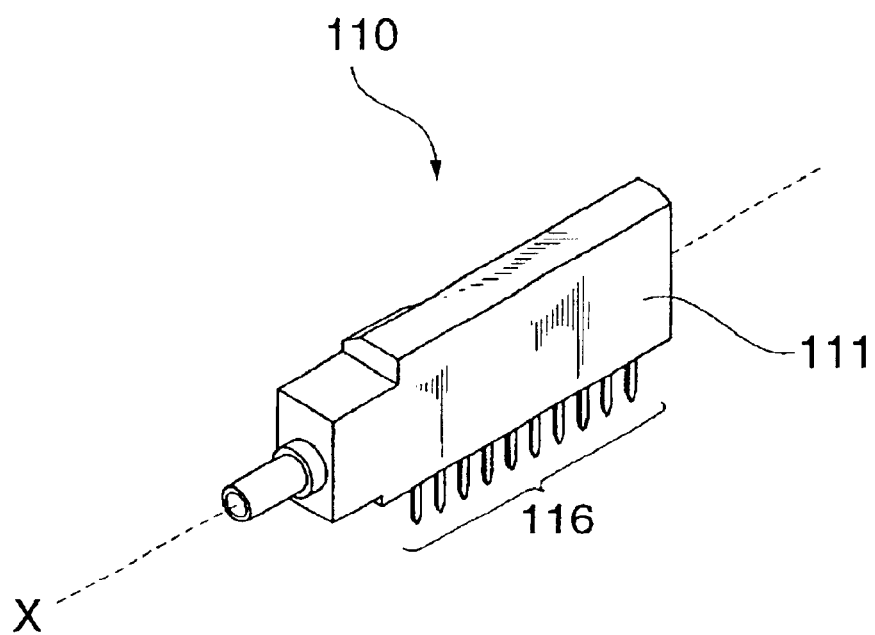
FIG. 14 is a perspective view showing a receiving optical module.

FIG. 14 is a perspective view showing the receiving optical module 110. As shown in FIG. 14, the optical module 110 has a structure of SIP (single inline package) type whose exterior is substantially formed like a square pole, whereas a lead array 116 projects from its bottom face. Unlike the transmitting optical module (10 in FIG. 1), the receiving optical module 110 comprises no external board mounted with volumes (44 in FIG. 11) for adjusting electric characteristics. First, for convenience of explanation, the inner configuration of the optical module 110 will be explained.

Figure 15:
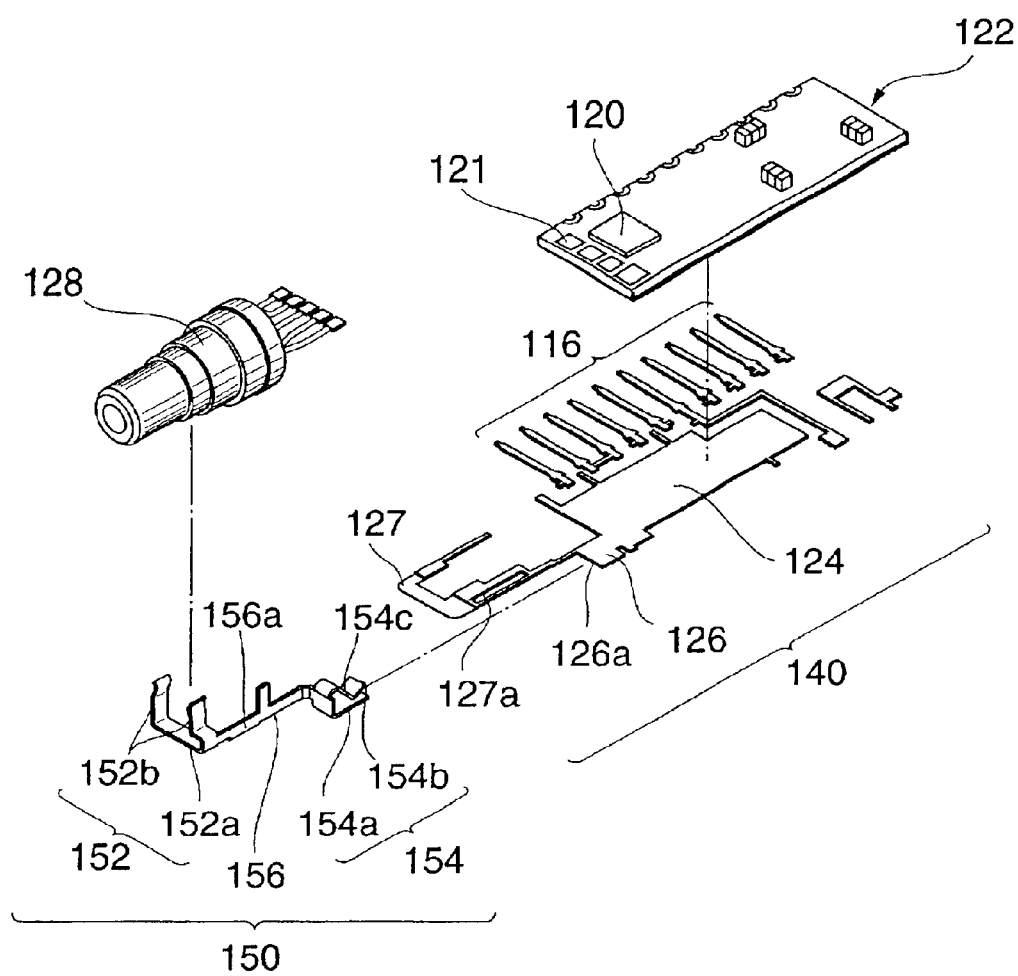
FIG. 15 is a perspective view showing the inner structure of the receiving optical module in an exploded state.

FIG. 15 is a perspective view showing the inner configuration of the optical module 110 in an exploded state. As shown in FIG. 15, within a resin member (111 in FIG. 15), the optical module 110 comprises a light-receiving device assembly (optical device assembly) 128, an electronic device 120, an internal board (circuit board) 122, a lead frame 140, and a holding member 150. The light-receiving device assembly 128 includes a light-receiving device (optical device) 118 for converting an optical signal into an electric signal. The electronic device 120 processes the signal from the light-receiving device 118. The internal board 122 mounts the electronic device 120 thereon. The lead frame 140 has an island (board mounting part) 124 for mounting the internal board 122, the lead array 116, and a support part 126. The holding member 150 holds the light-receiving device assembly 128.

The island 124, lead array 116, and support part 126 constituting the lead frame 140 are provided on a reference surface including the island 124. The lead array 116 is constituted by 10 lead pins, and is connected to a mount board (not depicted), so as to make it possible to transmit electric signals between the optical module 110 and the outside.

Figure 16:
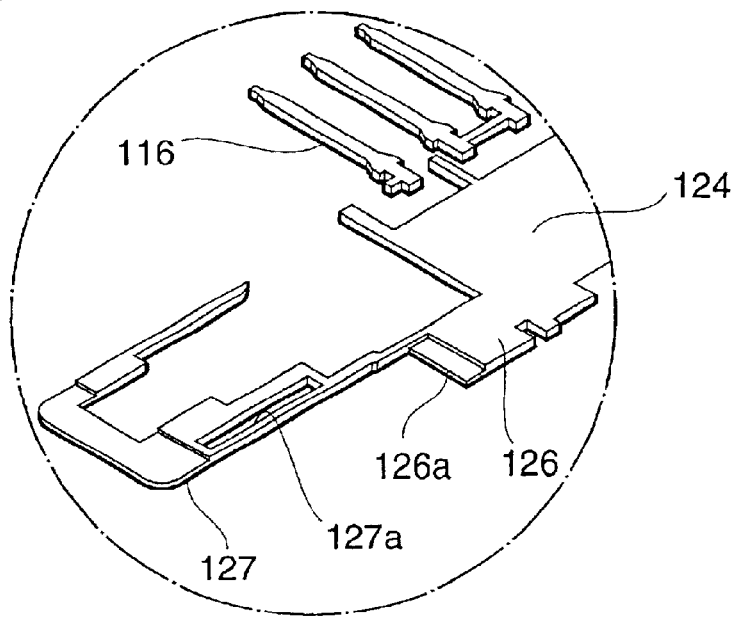
FIG. 16 is a view showing, under magnification, the vicinity of the support part shown in FIG. 15.

FIG. 16 is an enlarged view showing, under magnification, the vicinity of the support part 126 included in the lead frame 140 shown in FIG. 15. As shown in FIG. 16, the support part 126 is provided on the reference surface including the island 124, whereas its edge portion 126a on the side to which the holding member 150 is introduced has a thickness smaller than that of the other portion. In the receiving optical module 110, unlike the transmitting optical module (10 in FIG. 1), the support member 126 and the island 124 are integrated with each other.

Also, as shown in FIGS. 15 and 16, the lead frame 140 has the auxiliary part 127 for aiding in supporting the holding member 150. The auxiliary part 127 is constituted by a frame-like member having one end connected to the support part 126. The auxiliary part 127 includes a positioning hole 127a for positioning the holding member 150. The positioning hole 127a has such a size that a clearance of about several hundreds of micrometers is yielded when a positioning protrusion 156a of the holding member 150 which will be explained later is fitted therein. The auxiliary part 127 is provided on the reference surface including the island 124 as with the other members constituting the lead frame 140.

Preferably, the lead frame 140 is formed from a metal excellent in heat radiation such as Cu type alloys. Preferably, for enhancing the resistance to corrosion and the soldering property, the lead frame 140 is plated with Ni, Ni/Au, Ni/Pd, Ni/Pd/Au, and the like.

Figure 17:
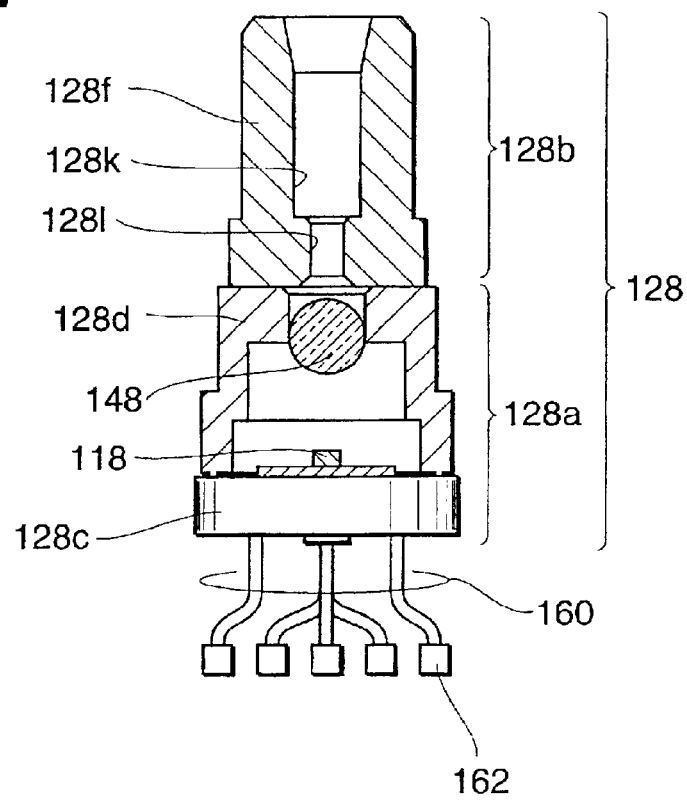
FIG. 17 is a sectional view showing the structure of a light-receiving device assembly.

As shown in FIG. 17, the light-receiving device assembly 128 has a device container 128a and a guide portion 128b. The device container 128a hermetically encloses therein the light-receiving device 118 such as a photodiode (p-i-n type photodiode or avalanche diode), for example. The device container 128a has a base 128c formed from a metal material such as covar. Mounted on the base 128c is a lens cap 128d made of a metal material such as stainless steel. The device container 128a has a window 148 formed in the lens cap 128d. The window 148 can include a condenser lens, and can transmit therethrough light to be received by the light-receiving device 118. The base 128c also has connection pins 160 for electrically connecting with the light-receiving device 118. The connection pins 160 are subjected to lead forming so as to form flat portions 162, thus yielding a form suitable for wire bonding.

The guide portion 128b has a sleeve 128f made of a metal material such as stainless steel. The sleeve 128f is formed with a precise hole 128k for receiving and positioning a ferrule. A through hole 128l is formed so as to reach the precise hole 128k from an end of the sleeve 128f opposite from the end formed with the precise hole 128k.

The electronic device 120 is a signal processing device for carrying out a predetermined processing operation to a signal received thereby and outputting the processed signal, e.g., a device incorporating therein an amplifier circuit for amplifying the electric signal outputted from the light-receiving device 118 included in the light-receiving device assembly 128. As shown in FIG. 15, the electronic device 120 is mounted on the internal board 122 made of an epoxy multilayer wiring board or the like, whereas the internal board 122 is mounted on the island 124 of the lead frame 140. The potential of the land on the rear face thereof is $V_{ee}$, whereby the potential of the island 124 is $V_{ee}$.

The holding member 150 has a holding part 152 for holding the light-receiving device assembly 128, and a grasping part 154 for grasping the support part 126 of the lead frame 140. The holding part 152 includes a base portion 152a adapted to abut against the side face of the sleeve 128f of the light-receiving device assembly 128, and a pair of sheet spring pieces 152b formed in a bending fashion at both ends of the base portion 152a so as to hold the sleeve 128f therebetween. The grasping part 154 for grasping the support part 126 of the lead frame 140 has a base portion 154a and a pressing portion 154b for urging the support part 126 toward the base portion 154a. The pressing portion 154b is formed so as to bend like letter V, such that a bent portion 154c is located on the base portion 154a side, whereby the width between the base portion 154a and the pressing portion 154b is the narrowest in the bent portion 154c. Also, the width between the base portion 154a and pressing portion 154b in the end part on the side to be introduced to the support part 126 is greater than that in the bent portion 154c. This makes it easier to introduce the grasping part 154 to the support part 126. The holding part 152 and the grasping part 154 are connected to each other by a connecting part 156. The connecting part 156 is provided with a protrusion 156a adapted to fit into the positioning hole 127a in the auxiliary part 127 of the lead frame 140.

The ultimate strength of the holding member 150 is preferably as high as possible. When holding the optical device assembly 128 with the holding member 150 or attaching the holding member 150 to the support part 126, a distortion occurs in the holding member 150. If the stress accompanying this distortion exceeds the ultimate strength, the holding member 150 may break at the time when a slight stress applies thereto after the attachment. Even if the holding member 150 does not break, its force for grasping the optical device assembly 128 or support part 126 may decrease due to plastic deformation, thereby lowering the degree of conduction. Therefore, it is necessary that the holding member 150 be designed such that the force acting on at least the grasping part 154 and holding part 152 of the holding member 150 becomes a stress not greater than the ultimate strength, preferably not higher than the yield point (so that the distortion of the holding member 150 is an elastic strain). From this point, the ultimate strength is preferably as high as possible when choosing a material for the holding member 150.

Since the holding member 150 is formed as a component separate from the lead frame 140 in this embodiment, a material can be chosen for the holding member 150 while taking a preference for its ultimate strength, whereas a material can be chosen for the lead frame 140 while taking a preference for its heat radiation, whereby the degree of freedom in choosing the material for the holding member 150 increases. As the material for the holding member 150, phosphor bronze, nickel silver, stainless steel, and the like are suitable.

In the optical module 110 in accordance with this embodiment, the grasping part 154 of the holding member 150 grasps the support part 126 of the lead frame 140, whereby the holding member 150 is supported. Here, the positioning protrusion 156a of the connecting part 156 of the holding member 150 is inserted in the positioning hole 127a of the auxiliary part 127 of the lead frame 140 so as to be positioned, whereas the holding member 150 is supported by the auxiliary part 127 by way of the holding part 152. While in a state held on the holding member 150 by way of the holding part 152, the light-receiving device assembly 128 is subjected to wire bonding between connection pins 160 extending from the base 128c of the light-receiving device assembly 128 and bonding pads 121 on the internal board 122, whereby electric connection is achieved between the light-receiving device 118 and the electronic device 120.

The optical module 110 is constructed such that the light-receiving device assembly 128; the internal board 122 mounted with the electronic device 120; the lead frame 140 including the island 124, lead array 116, and support part 126; and the holding member 150 are encapsulated with the resin member 111.

Here, as shown in FIG. 14, the lead array 116 is resin-encapsulated at only one end, whereas the other end projects from the resin member 111. The sleeve 128f of the light-receiving device assembly 128 is resin-encapsulated at only one end, whereas the other end projects from the resin member 111.

As a consequence, the optical module 110 is formed into a substantially square pole having two side faces, positioned parallel to the resin-encapsulated internal substrate 122, extending along the optical axis X; and two side faces positioned perpendicular to the internal board 122.

The optical axis X of the light-receiving device 118 in the light-receiving device assembly 128 is shifted from the reference surface including the island 124 of the lead frame 140. In the optical module 110, positions of the lead pins 116, the position of the optical axis X of the light-receiving device 118, and the like are defined by industrial standards, which make it necessary to shift the optical axis X of the light-receiving device 118 in the light-receiving device assembly 128 from the reference surface. Since the holding member 150 is constructed as a member separate from the lead frame 140, the optical module 110 can easily satisfy such a demand of industrial standards.

A method of making the receiving optical module 110 in accordance with this embodiment will now be explained.

Figure 18:
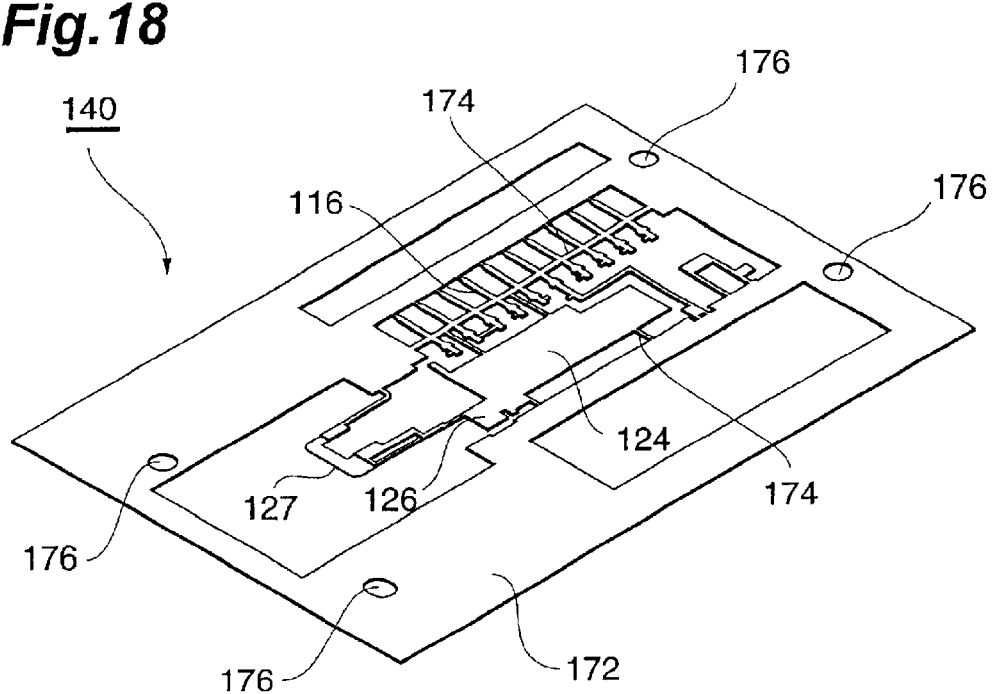

First, as shown in FIG. 18, a lead frame 140 having an island 124 for mounting an internal substrate 122, a lead array 116, a support part 126 for supporting a holding member 150, and an auxiliary part 127 is prepared. These members constituting the lead frame 140 are integrated by an outer frame part 172 and suspension pins 174. Here, in the making of the receiving optical module 110, the support part 126 is integrated with the island 124. Such a lead frame 140 can be integrally formed by etching a thin metal sheet or punching it with a press, for example. A plurality of holes 176 for positioning a mold for resin molding, which will be explained later, are formed at predetermined positions of the outer frame part 172.

On the other hand, a light-receiving device assembly 128 accommodating therein a light-receiving device 118 such as the one shown in FIG. 17, an electronic device 120 and an internal board 122 for mounting the electronic device 120 such as those shown in FIG. 15, and a holding member 150 such as the one shown in FIG. 15 are prepared.

Figure 19:
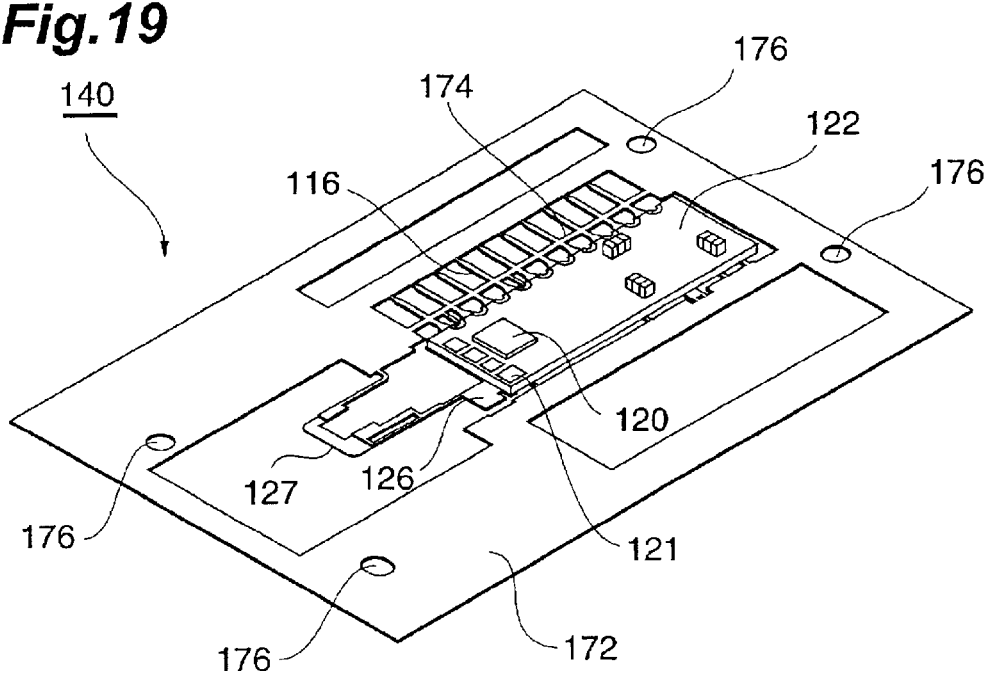

Subsequently, as shown in FIG. 19, the internal board 122 for mounting the electronic device 120 is mounted on the island 124 of the lead frame 140. Here, the internal board 122 is positioned such that end parts of the lead pins 116 are located at their corresponding plurality of pads provided on the rear face of the internal board 122, and the internal board 122 and the lead pins 116 are electrically connected to each other by soldering and the like.

Then, the electronic component 120 is mounted on the internal board 122. Alternatively, the electronic component 120 may be mounted on the internal board 122 beforehand.

Next, as shown in FIGS. 20A and 20B, the holding member 150 is supported by the support part 126 of the lead frame 140. Here, FIG. 20A is a view showing the state where the holding member 150 is supported by the support part 126 of the lead frame 140, whereas FIG. 20B is a view enlarging the vicinity of the holding member 150 shown in FIG. 20A.

In the step of supporting the holding member, as mentioned in the step of making the transmitting optical module 10, the edge portion 126a of the support part 126 of the lead frame 140 is initially engaged between the base portion 154a and pressing portion 154b of the grasping part 154 of the holding member 150. Subsequently, the holding member 150 is pushed toward the support part 126 against the urging force of the pressing portion 154b. Here, the edge portion 126a on the side to which the grasping part 154 of the support member 126 is introduced has a thickness smaller than that of the other portion, whereby the holding member 150 can be introduced to the support part 126 easily. Then, the positioning protrusion 156a of the holding member 150 is fitted into the positioning hole 127a of the auxiliary part 127 of the lead frame 140, so as to carry out rough positioning. Here, since a clearance of about several hundreds of micrometers exists between the positioning protrusion 156a and the positioning hole 127a, the holding member 150 can be displaced along the reference surface including the island 124 even in thus positioned state.

Figure 21:
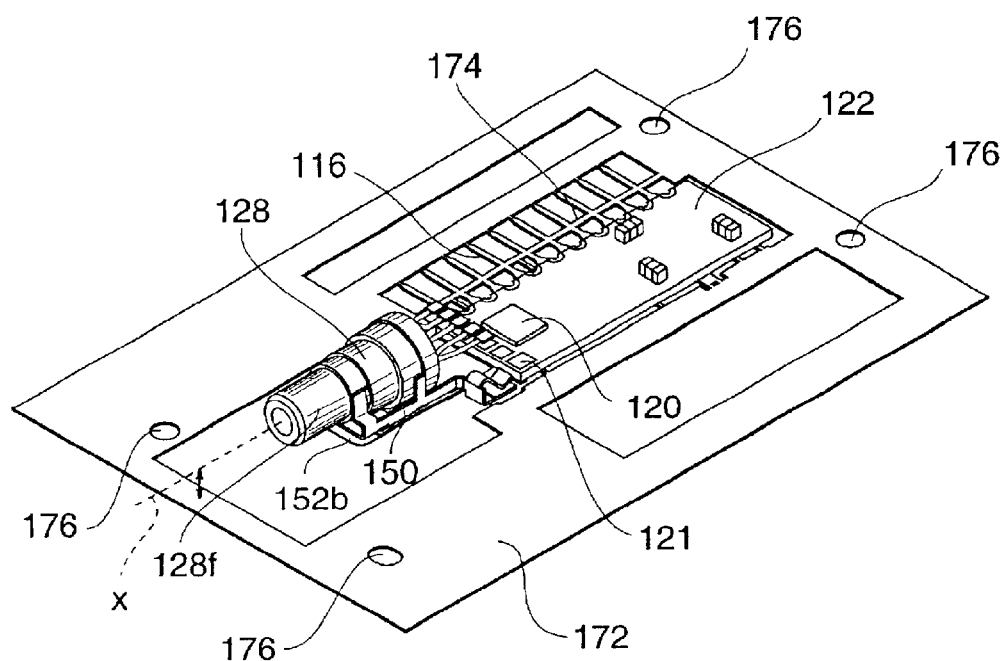

Subsequently, as shown in FIG. 21, the light-receiving device assembly 128 is mounted on the holding member 150 and held thereby such that the sleeve 128f is sandwiched between a pair of sheet spring pieces 152b constituting the holding part 152. Here, even after the light-receiving device module 128 is mounted on the holding member 150, the light-receiving device module 128 has a flexibility with respect to the lead frame 140 due to the sliding in the grasping part 154 of the holding member 150 and the elasticity of the holding member 150 itself. Therefore, a high degree of positioning is unnecessary at this stage, which facilitates assembling.

Subsequently, wire bonding is effected between connection pins 160 and bonding pads 121 of the internal board 122 by use of Al wires and the like.

Figure 22A:
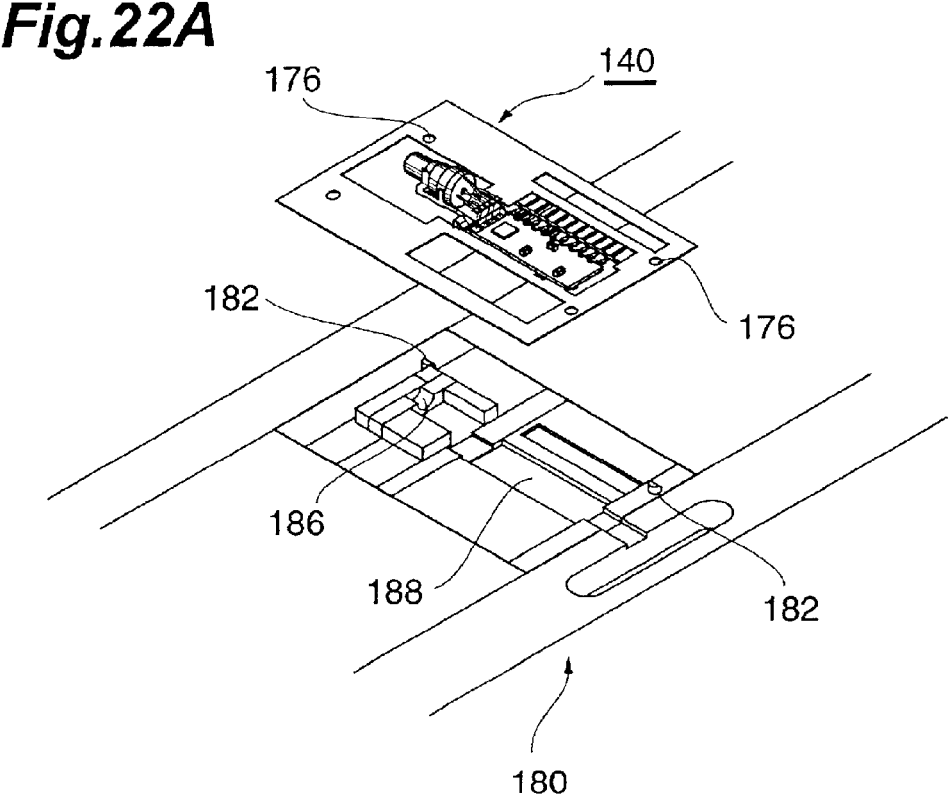
Figure 22B:
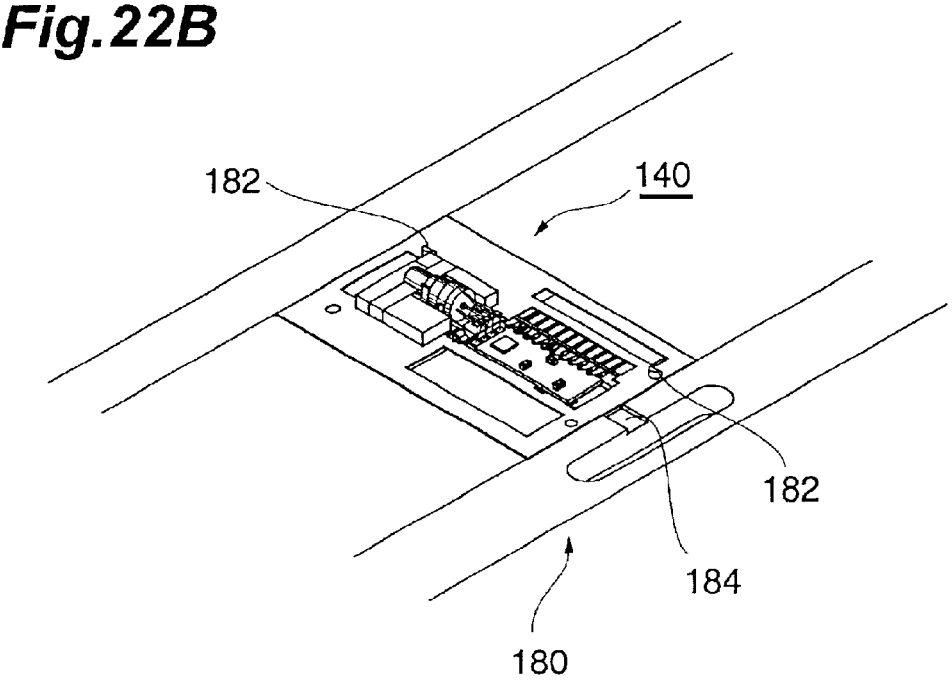
Figure 23:
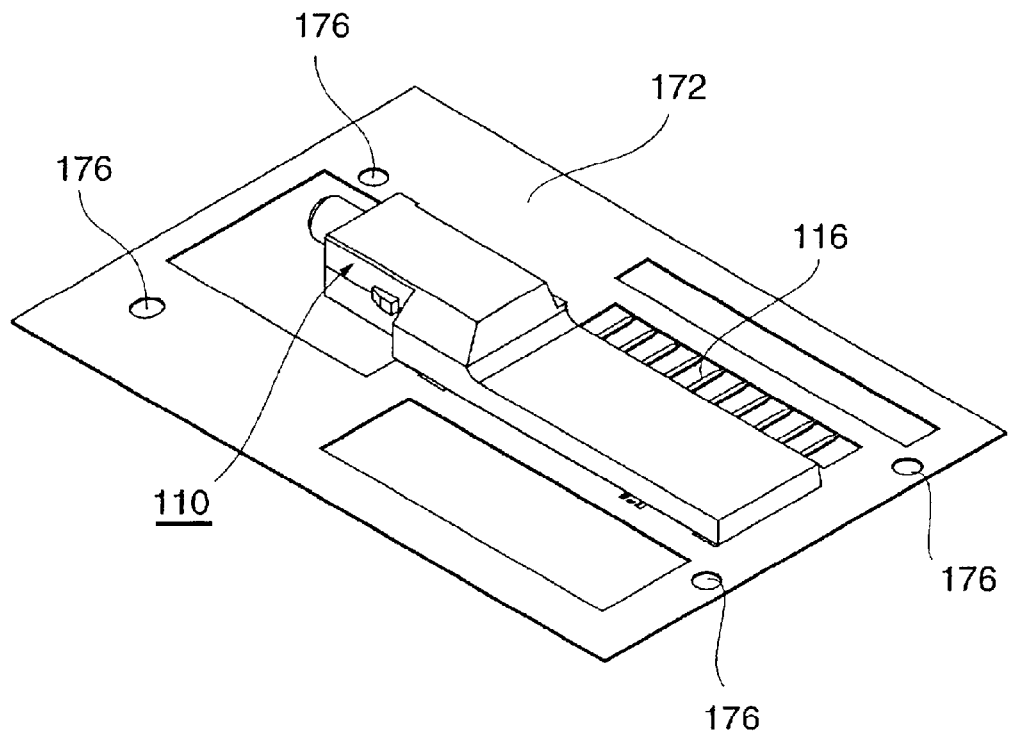

Then, as shown in FIGS. 22A and 22B, pilot pins 182 of a mold 180 for resin molding are inserted into holes 176 formed in the outer frame part 172, whereby the lead frame 140 is positioned and attached to the mold 180. Here, since the light-receiving device assembly 128 is reliably held by the holding member 150, it hardly causes positional deviations during when the lead frame 140 is transferred to the mold 180, whereby the fear of bonded wires breaking is lowered. The relative positional accuracy between the mold 180 and the lead frame 140 is determined by the dimensional accuracy of the lead frame 140, and is about ±30 μm in general. On the other hand, the position of the light-receiving device assembly 128 with respect to the mold 180 is determined by a sleeve aligning part 186 which is a groove having a semicircular cross section. Since a thermosetting resin is injected into a cavity 188 at a high pressure in a transfer-molding step, the outer diameter of the sleeve 128f and the sleeve aligning part 186 are under control so as to have a gap of about 10 μm therebetween.

Subsequently, the light-receiving device module 128 is precisely positioned within the mold 180 before resin encapsulation. Here, since the holding member 150 can be displaced along the reference surface, the positioning accuracy becomes higher when the light-receiving device assembly 128 is positioned before resin encapsulation as such, whereby the yield and characteristics of thus produced optical module 110 can be improved.

Next, while a resin is injected into the mold 180 through a gate 184, the light-receiving device assembly 128, the internal board 122 mounted with the electronic device 120, the lead frame 140 including the island 124, lead array 116, support part 126, and auxiliary part 127, and the holding member 150 are encapsulated with the resin.

Figure 24:
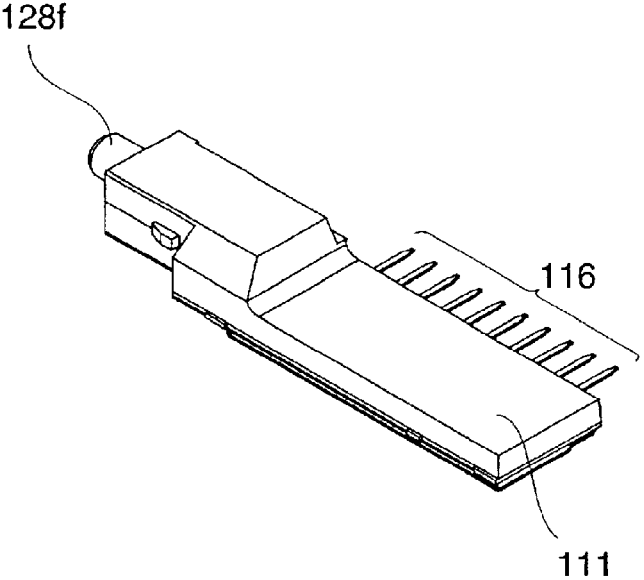

After the resin encapsulation, the optical module 110 integrated with the outer frame part 172 is removed from the mold 180, and the outer frame part 172 and suspension pins 174, which are unnecessary, are cut and eliminated as shown in FIG. 24. The making of the optical module 110 is thus completed. In this optical module 110, the support part 126 of the lead frame 140 and the light-receiving device module 128 are set to a potential of $V_{ee}$ which is the same as that of the island 124. This stabilizes the potential of the light-receiving device module 128, thereby being effective in securing a resistance to electromagnetic noise.

Figure 25:
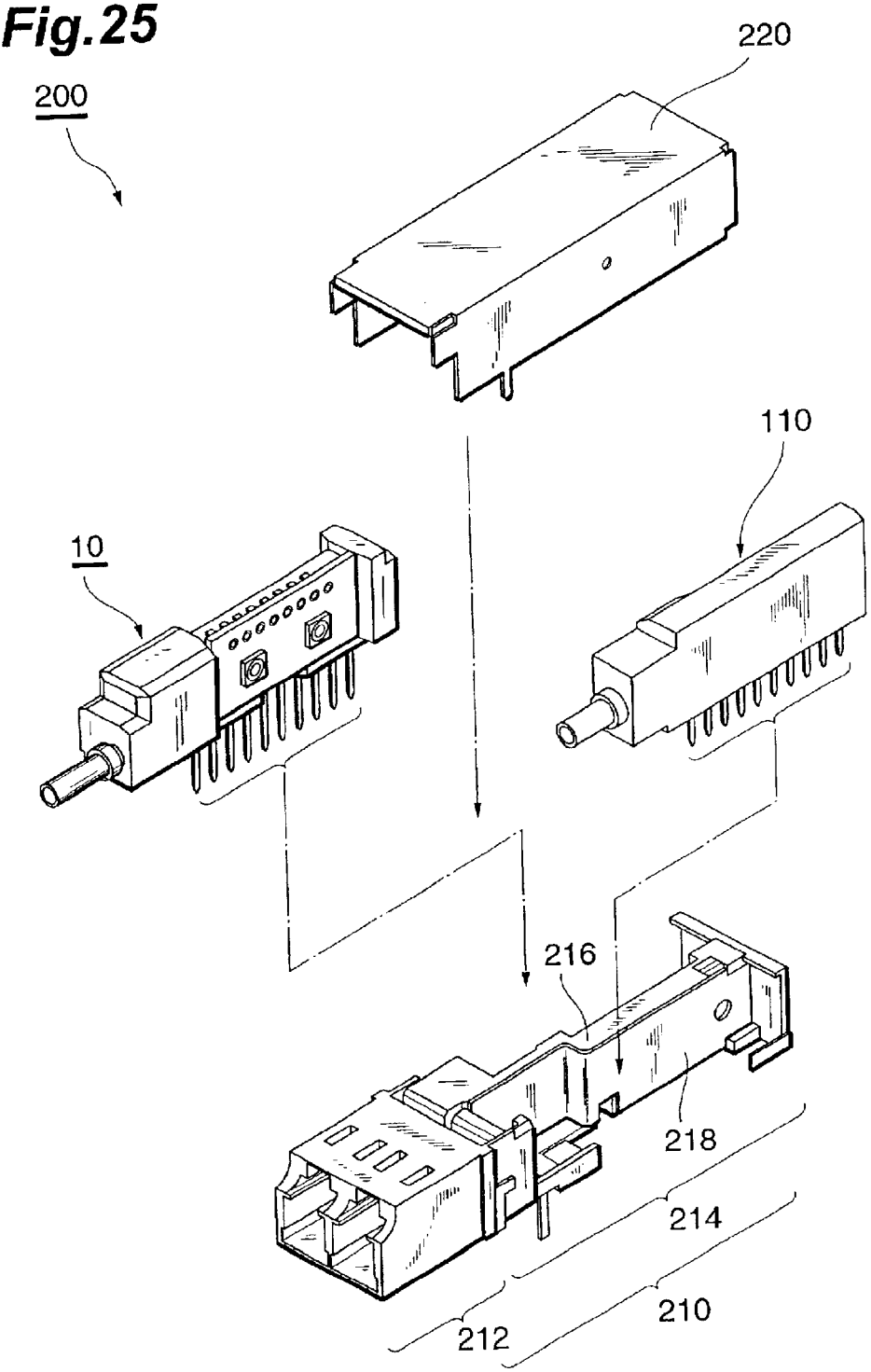
FIG. 25 is a perspective view showing an optical link apparatus in an exploded state.
Figure 26:
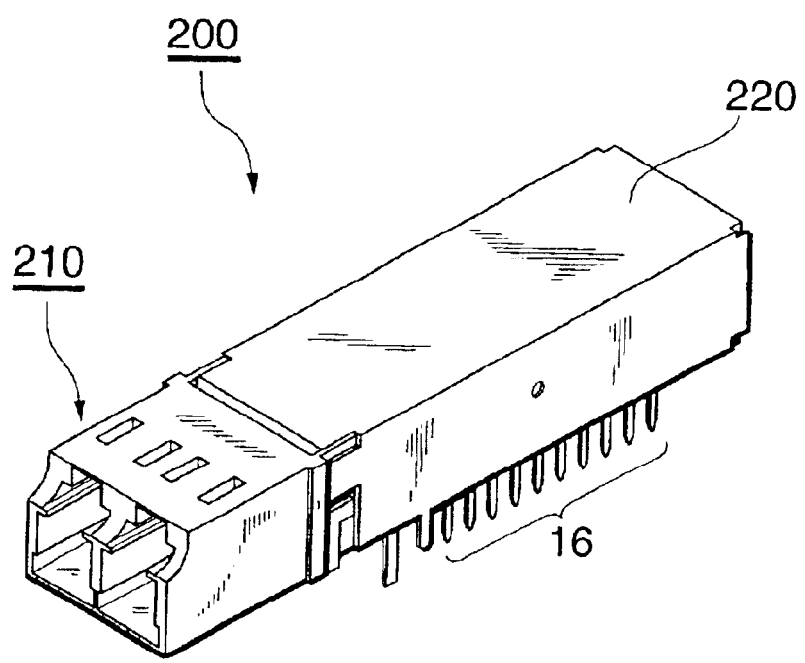
FIG. 26 is a perspective view showing the optical link apparatus.

The transmitting optical module 10 and receiving optical module 110 in accordance with this embodiment are accommodated in a housing 210 as shown in FIGS. 25 and 26, so as to form an optical link apparatus 200 together.

As shown in FIG. 25, the housing 210 is formed from an insulating plastic resin, while having a front portion provided with an optical receptacle part 212 to which transmitting and receiving optical connectors are detachably fitted and a rear portion provided with an optical module accommodating part 214. The optical module accommodating part 214 is divided by a partition wall 216 into a transmitting optical module accommodating part and a receiving optical module accommodating part. A metal shield 218 made of a thin metal sheet is attached to the partition wall 216 on the receiving optical module accommodating part side, so as to shield the transmitting optical module 10 and the receiving optical module 110 from each other.

The transmitting optical module 10 and the receiving optical module 110 are accommodated in the transmitting optical module accommodating part and receiving optical module accommodating part, respectively, with their faces mounted with the internal boards 22, 122 opposing each other. The optical module accommodating part 214 is covered and shielded with a housing cover 220 made of a metal. Thus, the optical link apparatus 200 having a substantially rectangular parallelepiped form as shown in FIG. 26 is formed.

Operations and effects of the transmitting and receiving optical modules 10, 110 in accordance with this embodiment will now be explained.

Since the optical module 10, 110 in accordance with this embodiment has the holding member 50, 150 provided separately from the lead frame 40, 140, it can easily respond to changes in design of the optical module 10, 110 by changing the holding member 50, 150 as needed. Also, the holding member 50, 150 has the grasping part 54, 154 for grasping the holding part 26, 126 of the lead frame and the holding part 52, 152 for grasping and holding the optical device assembly 28, 128. Therefore, conduction is fully secured between the optical device assembly 28, 128 and the holding member 50, 150 and between the holding member 50, 150 and the support part 26, 126, whereby the potential of each member is stabilized. As a result, the optical output waveform is improved in the transmitting optical module 10, whereas the resistance to electromagnetic noise is improved in the receiving optical module 110, whereby electric characteristics can be improved.

As explained in the foregoing, the present invention provides an optical module which can fully secure conduction between members so as to improve their characteristics while being able to quickly respond to changes in design, and a method of making the same.

From the foregoing explanations of the invention, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical module comprising:
   an optical device assembly having an optical device for converting one of optical and electric signals into the other;
   a circuit board for mounting an electronic device to electrically connect with said optical device;
   a lead frame having a lead pin, a board mounting part for mounting said circuit board, and a support part which are provided on a reference surface;
   a holding member having a holding part for grasping and holding said optical device assembly, and a grasping part for grasping said support part of said lead frame; and
   a resin member for encapsulating said optical device assembly, said circuit board, said holding member, and said lead frame.

2. An optical module according to claim 1, wherein said grasping part has a base portion provided so as to extend along said reference surface, and a pressing portion for urging said support part of said lead frame toward said base portion.

3. An optical module according to claim 2, wherein said grasping part has a narrowest portion yielding a narrowest width between said base portion and said pressing portion, whereas the width between said base portion and pressing portion in an end portion of said grasping part on a side introduced to said support part is greater than that between said base portion and pressing portion in said narrowest portion.

4. An optical module according to claim 1, wherein an edge portion of said support part on a side where said grasping portion is introduced has a thickness smaller than that in the other portion.

5. An optical module according to claim 1, further comprising an auxiliary part for aiding in supporting said holding member provided on said reference surface.

6. An optical module according to claim 5, wherein said auxiliary part of said lead frame includes a positioning hole for positioning said holding member, whereas said holding member has a protrusion adapted to fit into said positioning hole.

7. An optical module according to claim 1, wherein said holding part of said holding member includes a pair of sheet spring members for holding said optical device assembly therebetween.

8. An optical module according to claim 1, wherein said optical device in said optical device assembly has an optical axis shifted from said reference surface.

9. An optical module according to claim 1, wherein said optical device assembly and said circuit board are electrically connected to each other by a bonding wire.

10. A method of making an optical module, said method making the optical module according to claim 1 and comprising:
    a step of mounting said circuit board onto said board mounting part of said lead frame;
    a step of grasping said support part of said lead frame with said grasping part of said holding member and supporting said holding member displaceable along said reference surface;
    a step of grasping and holding said optical device assembly with said holding part of said holding member;
    a step of providing wire bonding between said optical device assembly and said circuit board; and
    a step of encapsulating said optical device assembly, said circuit board, said lead frame, and said holding member with a resin.

11. A method of making an optical module according to claim 10, further comprising a step of positioning said holding member prior to said resin encapsulating step.

12. A method of making an optical module according to claim 10, wherein said grasping part of said holding member has a base portion and a pressing portion for urging said support part of said lead frame toward said base portion; and
    wherein said step of supporting said holding member includes:
    a step of engaging an edge portion of said support part between said base portion and said pressing portion; and
    a step of pushing said holding member toward said support part.

* * * * *